(12) United States Patent
Uchida

(10) Patent No.: US 6,233,700 B1
(45) Date of Patent: May 15, 2001

(54) METHOD FOR MANAGEMENT OF CACHE PAGE AND MEDIUM HAVING A CACHE PAGE MANAGEMENT PROGRAM STORED THEREIN

(75) Inventor: Mitsujirou Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/321,115

(22) Filed: May 27, 1999

(30) Foreign Application Priority Data

May 27, 1998 (JP) ................................... 10-146237

(51) Int. Cl.[7] .................................................. G06F 11/00
(52) U.S. Cl. .................................. 714/20; 714/8; 714/7; 714/42; 714/764; 711/156
(58) Field of Search ..................... 711/129, 133, 711/134, 136, 156, 159, 160, 165, 167, 173, 206; 714/7, 8, 20, 42, 764

(56) References Cited

U.S. PATENT DOCUMENTS

| | | | | |
|---|---|---|---|---|
| 4,047,243 | * | 9/1977 | Dijkstra ................................. | 711/206 |
| 4,419,725 | * | 12/1983 | George et al. ........................ | 711/206 |
| 5,418,921 | * | 5/1995 | Cortney et al. ...................... | 711/114 |
| 5,442,766 | * | 8/1995 | Chu et al. ............................. | 711/204 |
| 6,145,055 | * | 11/2000 | Fujimoto ............................... | 711/128 |

OTHER PUBLICATIONS

R. Karedla et al., "Segment LRU Method", NIKKEI Electronics No. 617, Sep. 1994, pp. 107–121. (No Translation).

* cited by examiner

*Primary Examiner*—B. James Peikari
(74) *Attorney, Agent, or Firm*—Foley & Lardner

(57) ABSTRACT

Conventional segment LRU are used to capture data entries. The time that each entry is most recently accessed is stored and held from one entry to another. If a central processing unit encounters a cache failure upon accessing the cache memory for writing or reading data to or from the storage device, the time point of storage of an entry at an LRU position in a protection area and that of an entry at an LRU position in an examination area are compared to each other. If the former is earlier, the entry at the LRU position in the protection area is moved to an MRU position in the examination area to reduce the size of protection area, while the cache failure entry is added to the MRU position in examination area and an entry at the LRU position in the examination area is driven out of the cache memory. If the latter is earlier, the entry at the LRU position in the examination area is extracted and driven out of the cache memory and the cache failure entry is added to the MRU position in the examination area.

18 Claims, 8 Drawing Sheets

METHOD FOR MANAGEMENT OF CACHE PAGE AND MEDIUM HAVING A CACHE PAGE MANAGEMENT PROGRAM STORED THEREIN

FIELD OF THE INVENTION

This invention relates to a method for management of cache ages and a medium having a cache page management program stored herein. More particularly, it relates to a method for management of cache pages used in a disk storage device and a medium having a cache page management program stored therein.

DESCRIPTION OF THE RELATED ART

In a cache page management method, used in a control device of the above type, it is one of crucial elements to raise the bit ratio of the cache while suppressing the cache memory capacity to a smaller value.

For accomplishing this object, there is proposed a "Segment LRU method" such as is introduced in, for example, NIKKEI ELECTRONICS No. 617 (issued September 1994).

Referring to FIG. 7, a general structure of a disk control device is explained.

FIG. 7 is a block diagram showing a routine disk control device having a cache memory. As shown therein, a disk control device 30 is arranged between a central processing unit 20 and disk storage devices 40 to 43, andiskonstituted by a cache memory 33, a MPU 32 and a ROM 31 having a control program 31a.

In this cache memory 33, there are provided a set of cache pages, composed of a suitable number of cache pages 33b of suitable sizes, and a LRU table 33a adapted for supervising the cache pages 33b. As a matter of course, the accessing speed in the cache memory 33 is significantly higher than the accessing speed in the disk storage devices 40 to 43.

Referring to FIG. 8, the segment LRU method is now explained.

FIG. 8 shows the detailed structure of the LRU table shown in FIG. 7.

The segment LRU method is a method for supervising cache pages exploiting the fact that, if the business application is run on an information processing system, and a particular block on a disk storage device is accessed more than twice within a finite period of time, the probability is high that the same block is accessed in succession subsequently. It is a feature of this technique that the LRU table 33a is split into two regions, that is a protection area 1 and an examination area 2, as shown in FIG. 8.

The LRU table 33a, shown in FIG. 7, is constituted by plural entries 3 in one-to-one correspondence for each of the plural cache pages 33b. Each entry 3 has an address etc of the associated cache page 33b and a flag area 4 for storage of flags, with values of PROT and PROB, indicating to which of the protection area 1 and the examination area 2 belong the flags.

In this manner, the protection area 1 and the examination area 2 are of a list structure in which entries from a most recently accessed entry (most recently used termed as MSU) up to the earliest entry not accessed for long (least recently used termed as LRU) are interconnected by pointers.

The total number of the entries is physically determined by the capacity of the cache memory 33. The sizes of the protection area 1 and the examination area 2 are pre-set fixed values and are not changed during the operation.

The entry 3 at the MRU position of the protection area 1 is indicated by a pointer 6a, referred to below as PrtMruP, while the entry 3 at the LRU position of the protection area 1 is indicated as pointer 6b, referred to below as PrtLruP.

Similarly, the entry at the MRU position of the examination area 2 is indicated by a pointer 6c, referred to below as PrbMruP, while the entry 3 at the LRU position of the examination area 2 is indicated as a pointer 6d, referred to below as PrbLruP.

Meanwhile, in the segment LRU method, if a cache failure occurs, the entry 3 in the LRU position of the examination area 2 is driven from the cache memory 33 and a new entry 3 is added to the MRU position in the examination area 2. A value PROB is stored in the flag area 4 of the new entry 3 and data corresponding to the cache failure is stored and held in an associated cache page 33b.

In case of a cache hit, it is verified, based on the value of the flag area 4, whether or not the hit is that in the protection area 1 or that in the examination area 2. If the flag is PROT, the hit has occurred in the protection area 1 so that the entry 3 corresponding to the hit is moved to the MRU position in the protection area 1.

If the flag is PROB, the hit has occurred in the examination area 2 so that the entry 3 corresponding to the hit is moved to the MRU position in the protection area 1 at the same time as the flag area 4 of the entry 3 is changed to PROT. The decrease caused in the examination area 2 by this operation is eked out by movement of the entry 3 at the LRU position in the protection area 1 to the MRU position of the examination area 2. The flag area 4 of the moved entry 3 is rewritten from PROT to PROB.

By the above operation, there is caused a difference in priority in the time period during which the accessed data stay in the cache memory 33.

That is, data not re-used during the time the data is in the examination area 2 is driven out from the cache memory 33 without affecting the data in the protection area 1, while re-used data are moved to the protection area 1 so as to stay for prolonged time in the cache memory 33.

The segment LRU method has thus been employed up to now as effective means for raising the utilization efficiency of the disk cache, with the attention being directed to the characteristics of the disk accessing from the central processing unit.

SUMMARY OF THE DISCLOSURE

In the course of investigations toward the present invention, the following problems have been encountered.

With coming into widespread use of a non-stop continuous operation of the computer system, the operating configuration in which the online operation proceeds concurrently with the batch operation is increasing. In particular, in the batch operation, the disk space to which individual job's access is narrower and accessing occurs concentratedly in a shorter time. Therefore, the effect of the disk cache is felt to be promising.

However, in the batch operation, accessing is halted as soon as the job comes to a close, as characteristic of the batch operation. If the accessing pattern to the disk storage device is changed in this manner, a variety of problems are raised in the segment LRU method due to, for example, switching between batch jobs.

That is, the accessed disk space cannot follow up with the rapidly changing environment such that entries with drastically lowered re-use probability are "seized" in the vicinity of the LRU position of the protection region, thus lowering the hit ratio of the cache.

It is an object of the present invention to overcome the aforementioned problem and to provide a method for supervising cache pages in which the conventional segment LRU method has the ability of activating the "seized" entries and a medium having a management program for cache pages stored therein.

According a first aspect of, the present invention there is provided a novel method for management of a cache page in a system including a central processing unit, a storage device connected to the central processing unit, a cache memory connected to the central processing unit and having an accessing speed higher than that of the storage device, a set of a plurality of cache pages provided in the cache memory and an LRU table provided in the cache memory and constituted by a plurality of entries adapted for controlling the cache pages, wherein the LRU table is divided into a protection area and an examination area, and the following steps are conducted:

(a) in case of a cache failure, a cache failure entry is stored in the examination area and, on occurrence of overflow of the examination area with entries, an entry at an LRU position of the examination area is extracted and driven out of the cache memory, while the cache failure entry is added to an MRU position of the examination area, (b) in case of a cache hit in the protection area, the cache hit entry is extracted and moved to an MRU position in the protection area and, on occurrence of overflow of the protection area with entries, an entry at an LRU position of the protection area is moved to an MRU position of the examination area, and (c) in case of a cache hit in the protection area, entries in the protection area are interchanged in sequence so that the cache hit entry will assume an MRU position in the protection area. The methodiskharacterized in:

(d) that the most recent accessing time point of each entry is stored and held from one entry to another, (e) that, if cache failure has occurred when the central processing unit accesses the cache memory for data writing or data reading into/out of the storage device, the stored time point for an entry at the LRU position of the protection area and that for an entry at the LRU position of the examination area are compared to each other, (f) that, if the former time point is earlier, the entry at the LRU position in the protection area is moved to the MRU position in the examination area to reduce the size of the protection area, the cache failure entry is added to the MRU position in the examination area, and an entry at the LRU position in the examination area is driven out of the cache memory, and (g) that, if the latter time point is earlier, an entry at the LRU position in the examination area is extracted and driven out of the cache memory and, in its place, the cache failure entry is added to the MRU position in the examination area.

The subject-matter of according to a second aspect provides a method for management of a cache page, in a system including a central processing unit, a storage device connected to the central processing unit, a cache memory connected to the central processing unit and having an accessing speed higher than that of the storage device, a set of a plurality of cache pages provided in the cache memory and an LRU table provided in the cache memory and constituted by a plurality of entries adapted for controlling the cache pages, wherein the LRU table is divided into a protection area and an examination area, and the following steps are conducted:

(a) in case of a cache failure, a cache failure entry is stored in the examination area and, on occurrence of overflow of the examination area with entries, an entry at an LRU position of the examination area is extracted and driven out of the cache memory, while the cache failure entry is added to an MRU position of the examination area, (b) in case of a cache hit in the protection area, the cache hit entry is extracted and moved to an MRU position in the protection area and, on occurrence of overflow of the protection area with entries, an entry at an LRU position of the protection area is moved to an MRU position of the examination area, and (c) in case of a cache hit in the protection area, entries in the protection area are interchanged in sequence so that the cache hit entry will assume an MRU position in the protection area.

The methodiskharacterized in:

(d) that the number of times of entry storage in the examination area and the number of times of entry movement from the examination area to the protection area are sequentially updated and stored and saved, (e) that, if, upon accessing to the cache memory to write or read data into/out of the storage device, the central processing unit has encountered a cache failure, the number of times of entry movement from the examination area to the protection area divided by the number of times of entry storage in the examination area is compared to a pre-set value, (f) that, if the former value is larger, an entry of the LRU position in the examination area is extracted and driven out of the cache memory and, in its place, the cache failure entry is added to the MRU position in the examination area, and (g) that, if the latter value (pre-set value) is larger, an entry at the LRU position in the protection area is moved to the MRU position in the examination area to reduce the size of the protection area, the cache failure entry is added to the MRU position in the examination area and an entry at the LRU of the examination area is extracted and driven out of the cache memory.

According to a third aspect of the present invention, there is provided a recording medium (or generally medium) in a system including a central processing unit, a storage device connected to the central processing unit, a cache memory connected to the central processing unit and having an accessing speed higher than that of the storage device, a set of a plurality of cache pages provided in the cache memory, and an LRU table provided in the cache memory and constituted by a plurality of entries adapted for controlling the cache pages. The medium has a cache page management program recorded (or carried) thereon. The LRU table is divided into a protection area and an examination area, and the following steps are conducted in the program:

(a) in case of a cache failure, a cache failure entry is stored in the examination area and, on occurrence of overflow of the examination area with entries, an entry at an LRU position of the examination area is extracted and driven out of the cache memory, while the cache failure entry is added to an MRU position of the examination area, (b) in case of a cache hit in the protection area, the cache hit entry is extracted and moved to an MRU position in the protection area and, on occurrence of overflow of the protection area with entries, an entry at an LRU position of the protection area is moved to an MRU position of the examination area, and (c) in case of a cache hit in the protection area, entries in the protection area are interchanged in sequence so that the cache hit entry will assume an MRU position in the protection area. The recording medium is characterized in:

(d) the most recent accessing time point of each entry is stored and held from one entry to another, (e) that, if cache failure has occurred when the central processing unit accesses the cache memory for data writing or data reading into/out of the storage device, the stored time point for an entry at the LRU position of the protection area and that for an entry at the LRU position of the examination area are compared to each other, (f) that, if the former time point is earlier, the entry at the LRU position in the protection area is moved to the MRU position in the examination area to reduce the size of the protection area, the cache failure entry is added to the MRU position in the examination area, and an entry at the LRU position in the examination area is driven out of the cache memory, and (g) that, if the latter time point is earlier, an entry at the LRU position in the examination area is extracted and driven out of the cache memory and, in its place, the cache failure entry is added to the MRU position in the examination area.

According to a fourth aspect of the present invention, there is provided a recording medium (or in general medium), in a system including a central processing unit, a storage device connected to the central processing unit, a cache memory connected to the central processing unit and having an accessing speed higher than that of the storage device, a set of a plurality of cache pages provided in the cache memory, and an LRU table provided in the cache memory and constituted by a plurality of entries adapted for controlling the cache pages. The medium has a cache page management program recorded (or carried) thereon. The LRU table is divided into a protection area and an examination area, and the following steps are conducted in the program:

(a) in case of a cache failure, a cache failure entry is stored in the examination area and, on occurrence of overflow of the examination area with entries, an entry at an LRU position of the examination area is extracted and driven out of the cache memory, while the cache failure entry is added to an MRU position of the examination area, (b) in case of a cache hit in the protection area, the cache hit entry is extracted and moved to an MRU position in the protection area and, on occurrence of overflow of the protection area with entries, an entry at an LRU position of the protection area is moved to an MRU position of the examination area, and (c) in case of a cache hit in the protection area, entries in the protection area are interchanged in sequence so that the cache hit entry will assume an MRU position in the protection area. The program is characterized in:

(d) the number of times of entry storage in the examination area and the number of times of entry movement from the examination area to the protection area are sequentially updated and stored or saved, (e) that, if, upon accessing to the cache memory to write or read data into/out of the storage device, the central processing unit has encountered a cache failure, the number of times of entry movement from the examination area to the protection area divided by the number of times of entry storage in the examination area is compared with a pre-set value, (f) that, if the former value is larger, an entry of the LRU position in the examination area is extracted and driven out of the cache memory and, in its place, the cache failure entry is added to the MRU position in the examination area, and (g) that, if the latter value (pre-set value) is larger, an entry at the LRU position in the protection area is moved to the MRU position in the examination area to reduce the size of the protection area, the cache failure entry is added to the MRU position in the examination area and an entry at the LRU of the examination area is extracted and driven out of the cache memory.

Based on the aspects and features aforementioned of the present invention, the lowering in the probability of re-use of the entry/entries in the vicinity of the LRU position in the protection area is detected, and the entry/entries in that vicinity can be transferred to the examination area. Thus it provides an effect to recover the hit ratio of the cache.

PREFERRED EMBODEMENTS OF THE INVENTION

Figure 1:
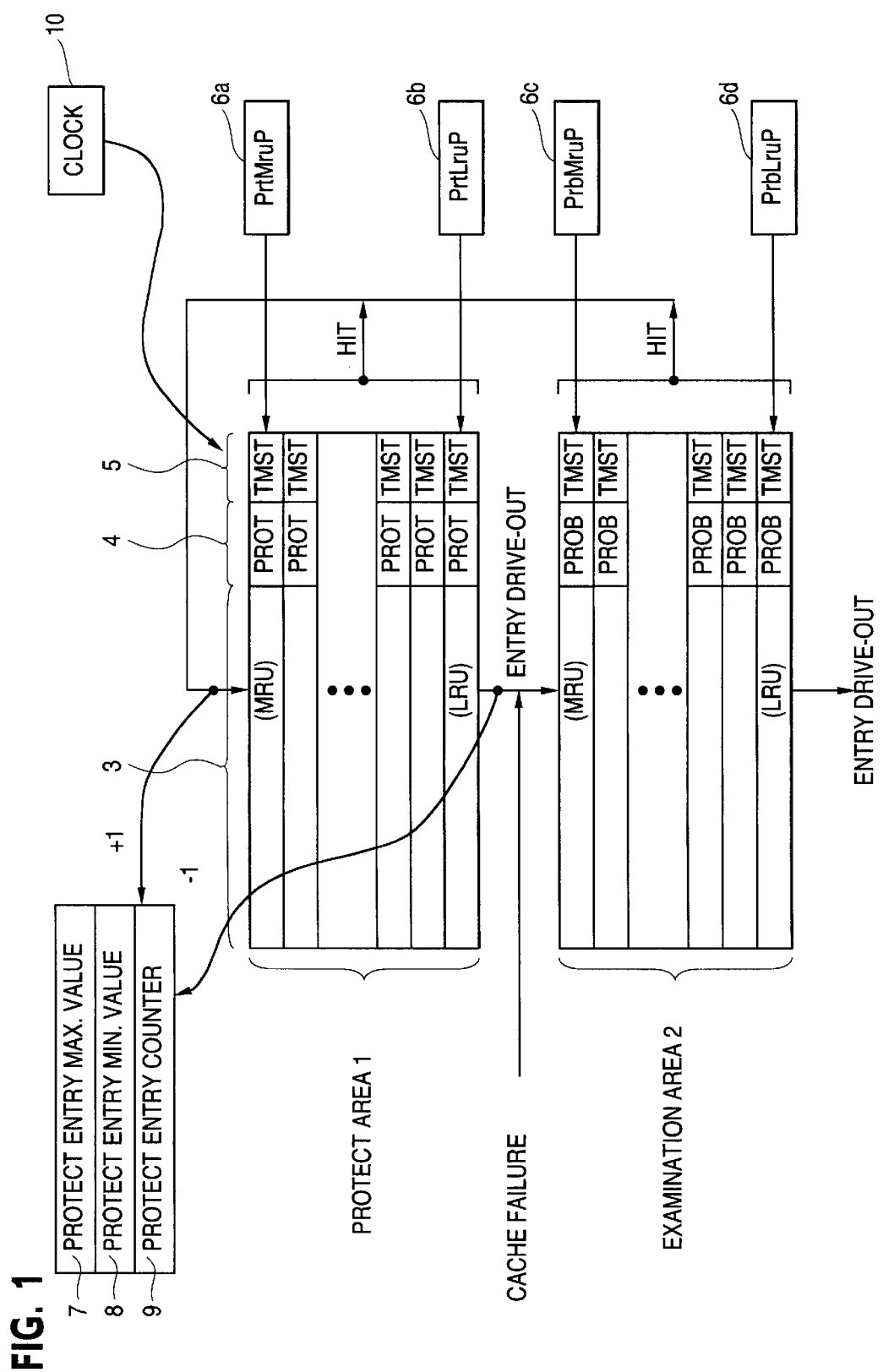
FIG. 1 illustrates an embodiment of the present invention.

Referring to the drawings, a preferred embodiment of the present invention is explained in detail.

First Embodiment

Figure 7:
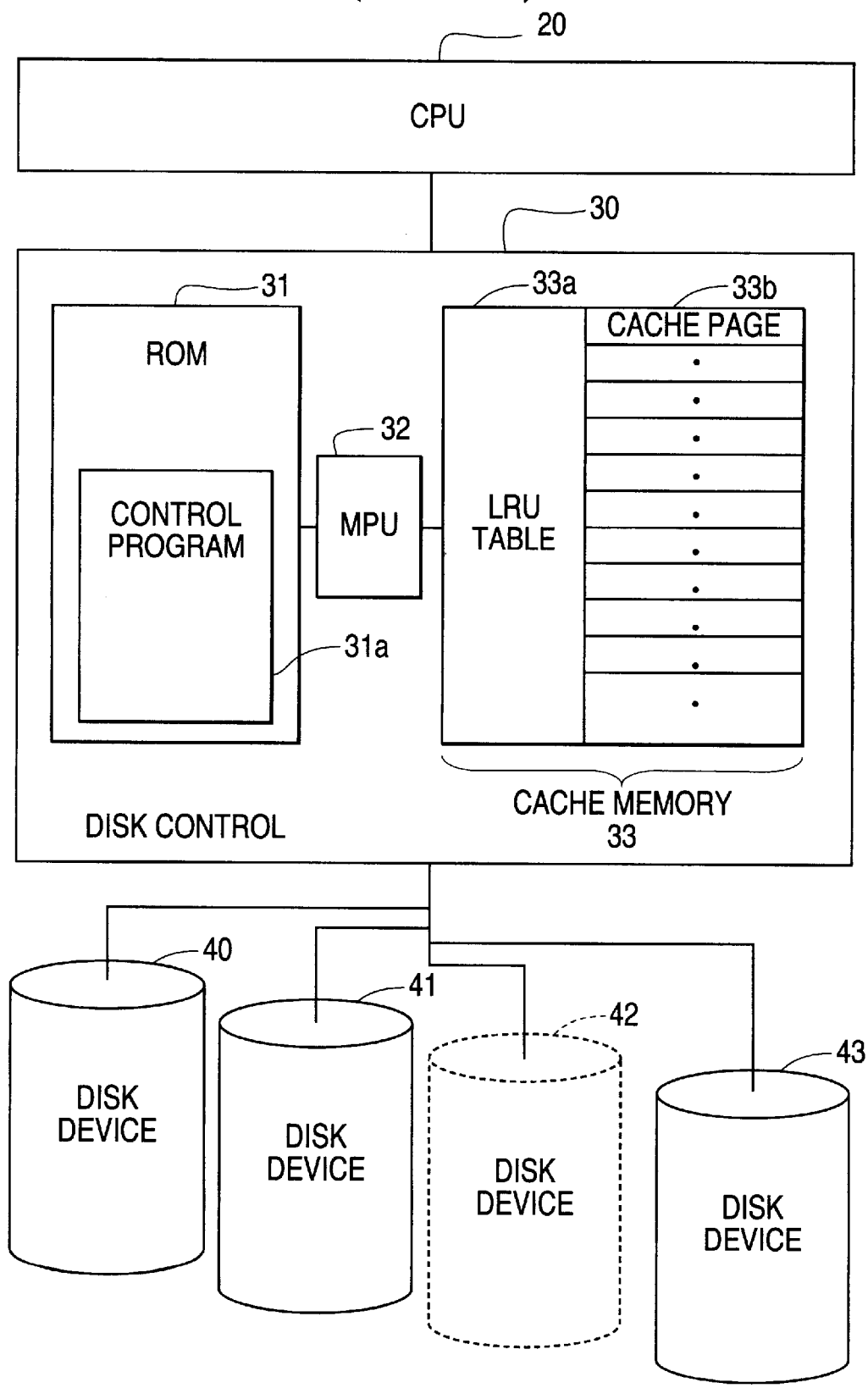
FIG. 7 is a block diagram showing a conventional disk control device.

The information system embodying the present invention is similar in the hard or physical structure to that shown in FIG. 7.

That is, a disk control device 30 is interposed between a central processing unit 20 and disk storage devices 40 to 43 and is made up of a cache memory 33, an MPU 32, a ROM 31 etc.

The cache memory 33 includes a suitable number of cache pages of suitable sizes and an LRU table 33a for supervising the cache pages 33b. A program (control program 33a) for supervising the cache pages 33b is stored and saved in the ROM 31.

The schematics of the operation of the present embodiment are explained with reference to FIG. 1.

Figure 8:
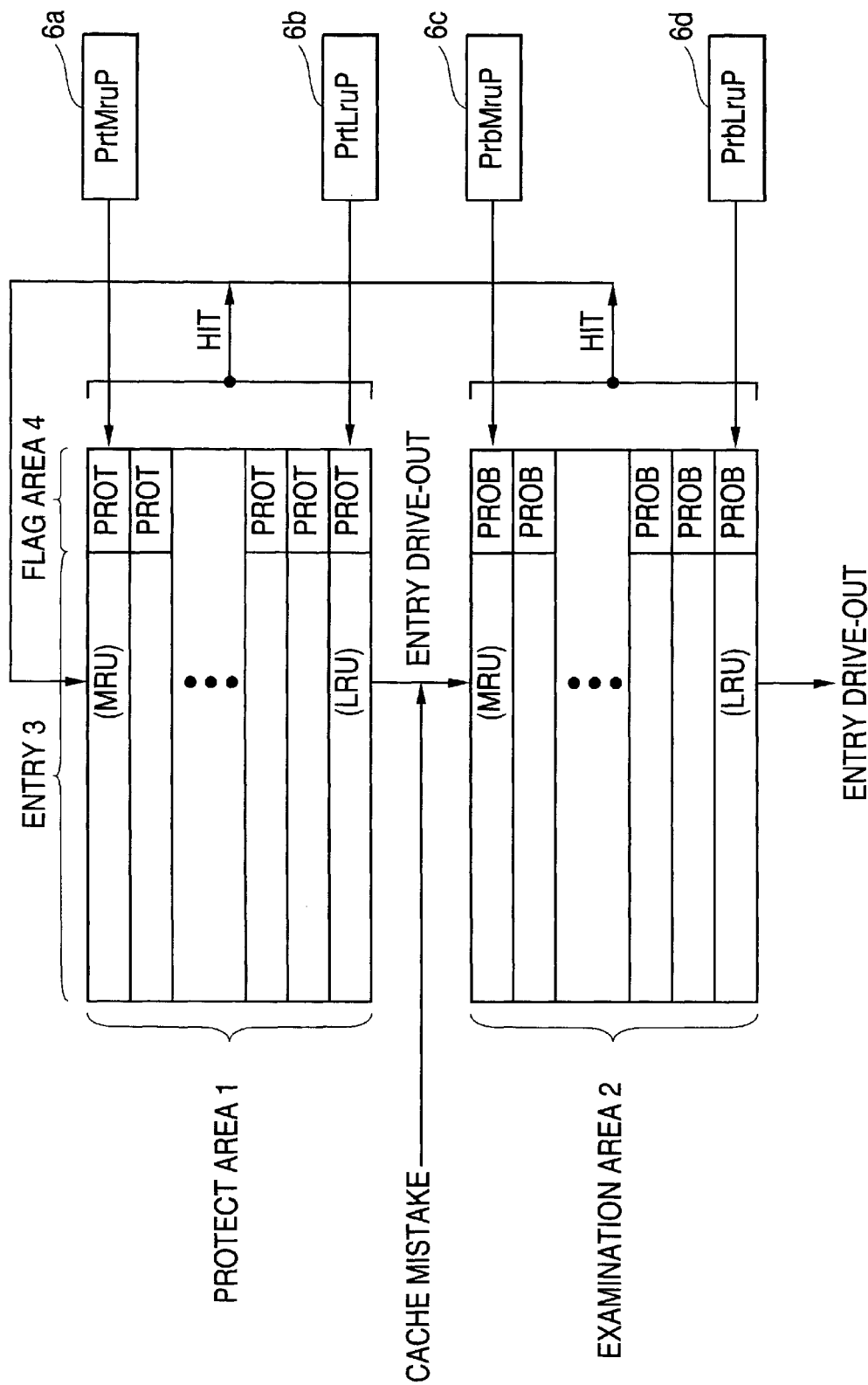
FIG. 8 illustrates a conventional technique.

In the present embodiment, the structure of the conventional segment LRU method, shown in FIG. 8, has, in addition to the conventional segment LRU method, a protect entry maximum value register 7, for storing the maximum number of entries that can exist in the protection area 1 in the disk control device 30, a protect entry minimum value register 8, for storing the minimum number of entries to be acquired in the protection area 1, a protect entry counter 9 for storing the current number of entries in the protection area 1, and a timepiece (clock) 10 having a durability exceeding that of the device, such as the disk storage device etc. In each entry 3 of the LRU table 33a, there is provided a TMST (time store) field 5 for storing the most recent accessing time.

In the protect entry maximum value register 7 and in the protect entry minimum value register 8, there are pre-set predetermined constants upon initializing the cache. These constants are empirically determined, from, e.g., the relation between the capacity of the disk storage device and that of the cache memory.

Figure 2:
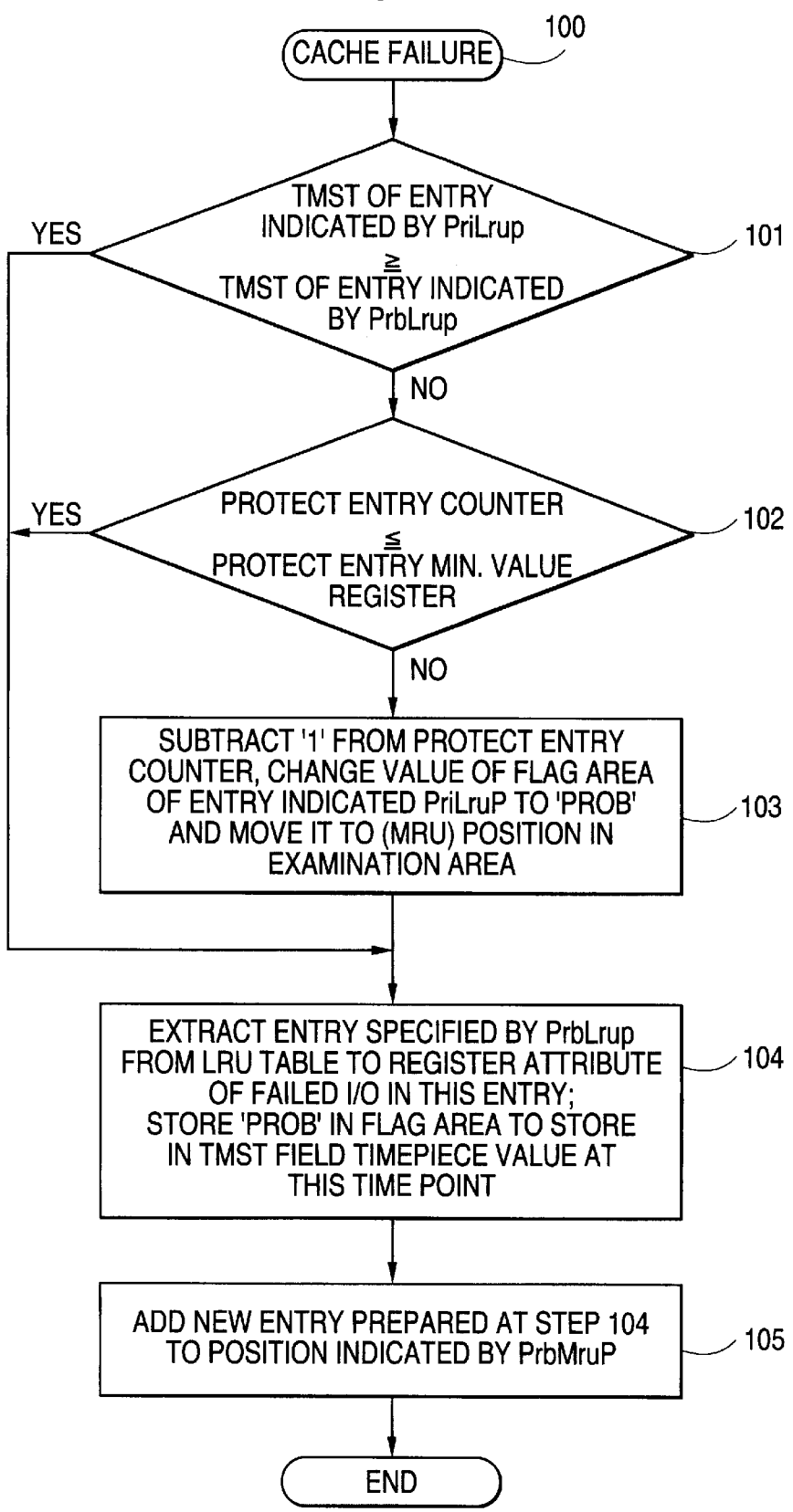
FIG. 2 is a flowchart for illustrating a sequence in case of cache failure in an LRU table shown in FIG. 1.

The operation in case of occurrence of cache failure (overflow) is explained with reference to FIG. 2.

At step 100, the operation in case of occurrence of cache failure is started.

At step 101, a TMST field 5, specified by PrtLruP, is compared to a TMST field 5, specified by PrbLruP. If the result of comparison indicates that it is the TMST field 5 specified by PrtLruP that is smaller, that is if the entry at the LRU position of the protection area 1 is earlier than the entry at the LRU position of the examination area 2, the program proceeds to the next step 102.

At step 102, it is verified whether or not the value of the current protect entry counter 9 is not larger than the value of the protect entry minimum value register 8. Depending on the result of decision at step 102, the next step 103 is skipped. That is, if it is the value of the protect entry counter 9 that is smaller, it indicates that the protection area 1 has allowance (room) for storing an entry. Conversely, if it is the value of the protect entry counter 9 that is larger, the protection area 1 cannot afford to store any entry in the protection area 1. In the latter case, the program proceeds to the next step 103 to reduce the size of the protection area 1.

At step 103, "1" is subtracted from the protect entry counter 9 to change the flag area 4 of the LRU position of the protection area 1 specified by PrtLruP to PROB to move it to the MRU position in the examination area 2. At the same time, PrtLruP and PrbMruP are updated.

By this operation, one entry is moved from the protection area 1 to the examination area 2 such that the size of the protection area 1 is reduced by one entry, while that of the examination area 2 is increased by one entry.

At step 104, an entry 3 at the LRU position in the examination area 2 specified by PrbLruP is extracted from the LRU table 33a, and data of the extracted entry 3 is driven out of the cache memory 33 and written into the disk storage device. The attribute information of an I/O which has encountered a failure, that is data of plural consecutive sectors on the hard disk, is registered in the cache pages 33b.

A value PROB is registered in the flag area 4 of the entry 3, and the value of the timepiece 10 at this time point is stored in the TMST field 5.

At step 105, the new entry 3 prepared at step 104 is added to the MRU position of the examination area 2 specified by the PrbMruP. At the same time, the PrbMruP value is updated and the processing at the time of the cache failure comes to an end.

Figure 3:
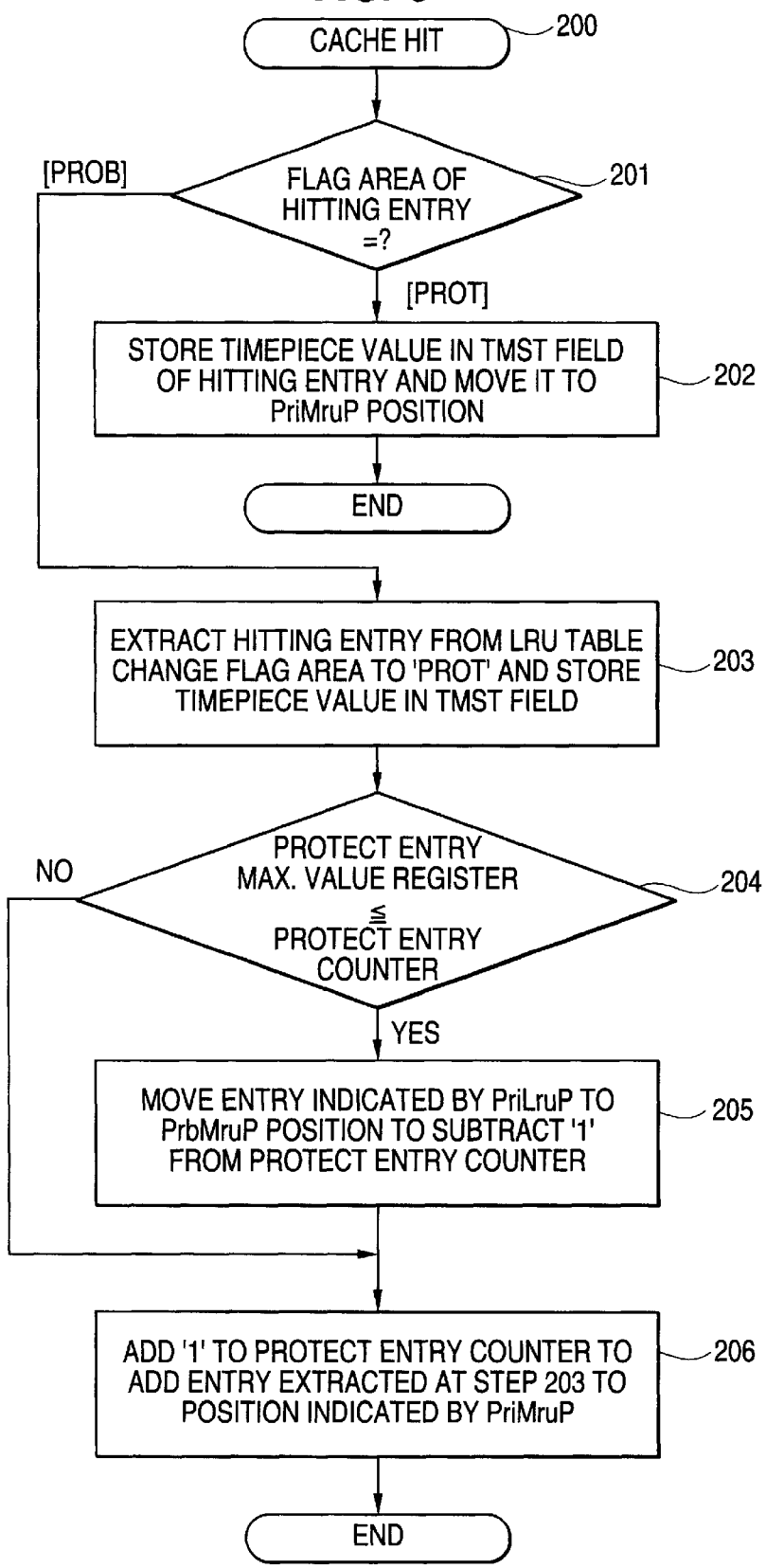
FIG. 3 is a flowchart for illustrating a sequence in case of cache hit in an LRU table shown in FIG. 1.

Next, the operation on the occasion of cache hit is explained with reference to FIG. 3.

The cache hit processing begins at step 200.

First, the flag area 4 of the entry 3 of the hit at step 201 is verified. If this has a value of PROB, the program proceeds to step 203. If it has a value of PROT, the program proceeds to step 202.

At step 202 (the case of hit in the protection area 1), the value of the timepiece 10 at the time point of accessing to the TMST field 5 of the hit entry 3 is stored. This entry 3 is moved to the MRU position of the protection area 1 specified by PrtMruP. At the same time, the value of PrtMruP is updated to terminate the operation for cache hit.

At step 203, (for hit occurrence in the examination area 2), the hit entry 3 is extracted from the LRU table 33a and the flag area 4 is changed to a value PROT, while the value of the timepiece 10 at the time point is stored in the TMST field 5.

At step 204, the value of the protect entry maximum value register 7 is compared to the value of the protect entry counter 9. If "value of the protect entry maximum value register 7"≦"value of the protect entry counter 9", the step 205 is executed.

At step 205, an entry at the LRU position of the protection area 1 specified by PrtLruP is moved to an MRU position of the examination area 2 specified by PrbMruP. At the same time, the values of PrtLruP and PrbMruP are updated. Then, "1" is subtracted from the protect entry counter 9.

At step 206, "1" is added to the protect entry counter 9, and the entry 3 extracted at step 203 is added to the MRU position of the protection area 1 specified by PrtMruP. At the same time, the PrtMruP value is updated to terminate the processing for cache hit.

In the first embodiment of the present invention, as described above, the time point of accessing to the entry at the LRU position of the protection area 1 and that to the LRU position of the examination area 2 are compared to each other to verify which time point is earlier (step 101).

Thus, by this verification, it is possible to estimate the possibility of re-using the cache page corresponding to the entry in the vicinity of the LRU position of the protection area 1.

Since the size of the protection area 1 can be increased (operation of skipping step 205 based on verification at step 204) or decreased (step 103), the size of the protection area 1 can be automatically adjusted to an optimum value.

For example, in the aforementioned batch operation, cache hits occur in succession as long as a job is going on, however, when the job comes to a close and a new job is started, cache failures immediately occur in succession. This is due to the fact that accessed disk areas differ from job to job. However, after lapse of certain period of time, entries concerning the new job are stored in the cache memory, such that cache hits occur as before at any rate.

If, in such case, the aforementioned teaching of the present invention is used, the examination area 2 is expanded automatically on successive occurrences of cache failure so that more entries than with the conventional system can be stored upon job change. Of course, since the protection area 1 charged fully with the entries 3 of the old job can be reduced while the examination area 2 is expanded, it can be said that wasteful retrieval can be evaded. In light of the foregoing, the present embodiment may be said to exhibit meritorious effect which was not possible in the conventional practice, since the sizes of the protection area 1 and the examination area 2 can be automatically adjusted to optimum values.

Second Embodiment

Referring to the drawings, a second embodiment of the present invention is explained. In the present embodiment, the hit ratio in the examination area 2 is used as a method for changing the size of the protection area 1 as the main point of the invention.

Figure 4:
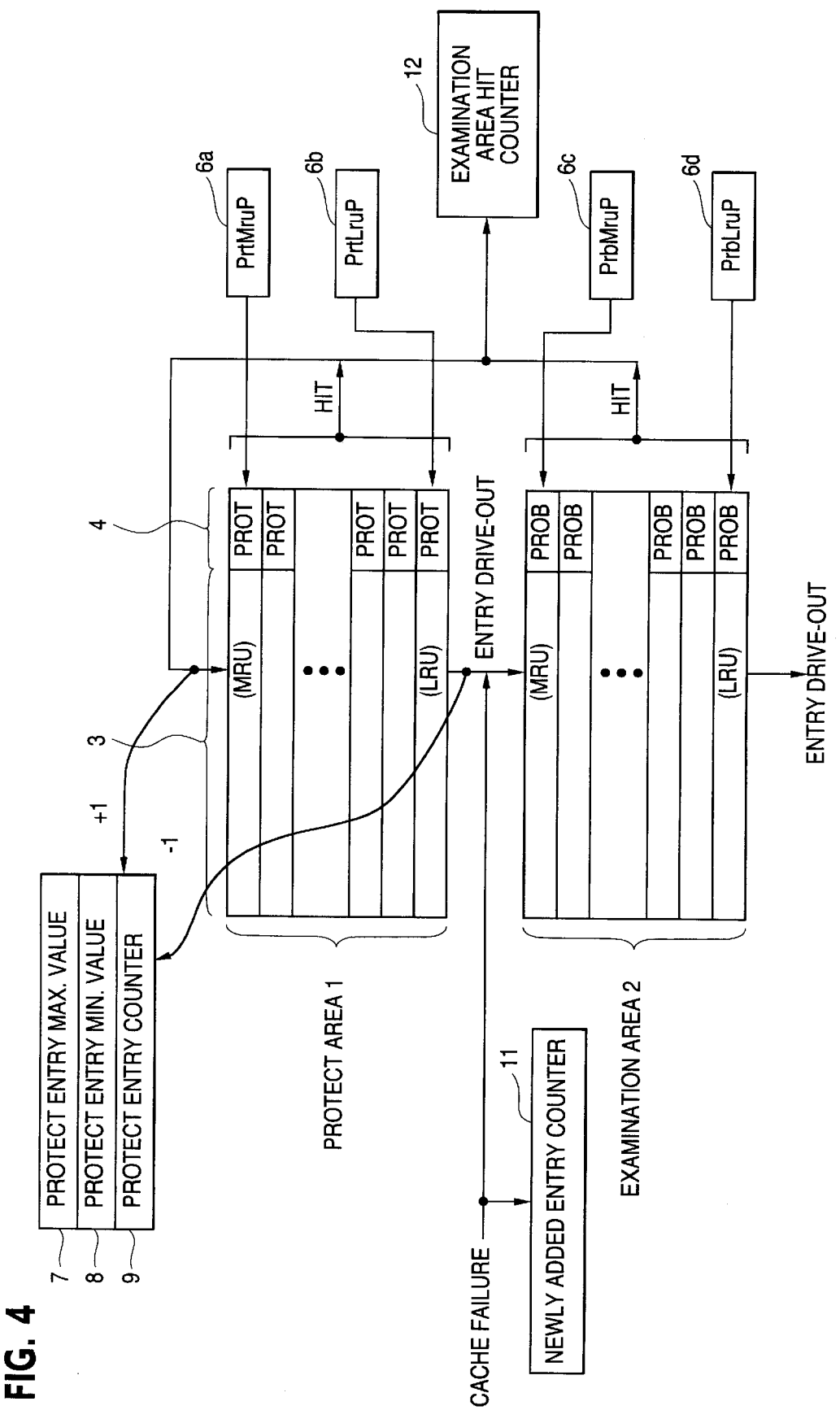
FIG. 4 illustrates another embodiment of the present invention.

FIG. 4 illustrates the second embodiment of the present invention. As shown in FIG. 4, there are provided, in the second embodiment, in addition to the structure shown in FIG. 1, a newly added entry counter 11 for counting the number of times of addition of new entries 3 to the LRU table 33a on occurrence of cache failures, and an examination area hit counter 12 for counting the number of times of movement of the entries 3 to the protection area 1 by hits in the examination area 2.

As in the case of FIG. 1, constants are pre-set in the protect entry maximum value register 7 and in the protect entry minimum value register 8 upon initializing the cache.

Figure 5:
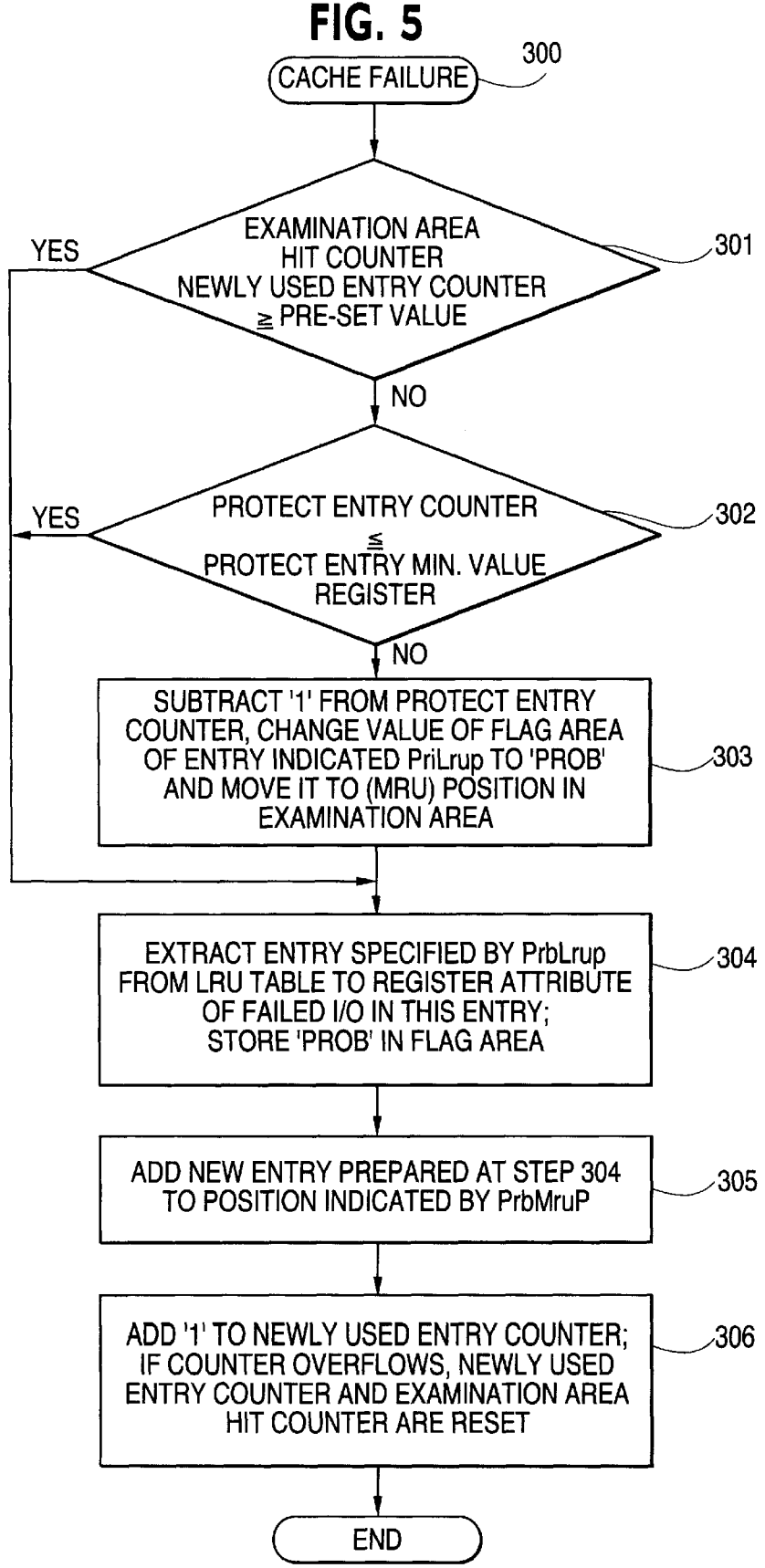
FIG. 5 is a flowchart for illustrating a sequence in case of cache failure in an LRU table shown in FIG. 4.

Referring to FIG. 5, the operation of the occasion of cache failures is explained.

The cache failure processing starts with step 300.

At step 301, a quotient obtained on dividing the value of the examination area hit counter 12 by the value of the newly added entry counter 11 is compared to a pre-set constant value. Responsive to the result of comparison, steps 302 and 303 are skipped.

At step 302, the next step 303 is skipped, depending on whether or not the current value of the protect entry counter 9 is smaller than the value of the protect entry minimum value register 8.

At step 303, "1" is subtracted from the protect entry counter 9, and a flag area 4 of the entry 3 at the LRU position of the protection area 1 is changed to the value PROB, which is moved to the MRU position in the examination area 2. At the same time, the values of PrtLruP and PrbMruP are updated.

By this processing, one entry 3 is moved from the protection area 1 to the examination area 2.

Then, at step 304, the entry 3 at the LRU position in the examination area 2 is extracted from the LRU table 33a. The extracted data is driven out from the cache memory and written in the disk storage device. The attribute information of the cache failed I/O, (that is data of plural consecutive sectors on the disk storage device), is registered in the cache pages 33b, and the value PROB is stored in the flag area 4 of the entry 3.

At step 305, a new entry 3, prepared at step 304, is added to the MRU position of the examination area 2 indicated by PrbMruP. At the same time, the value of PrbMruP is updated.

At step 306, "1" is added to the newly added entry counter 11. If the newly added entry counter 11 overflows, both the newly added entry counter 11 and the examination area hit counter 12 are reset simultaneously to terminate the cache failure processing.

Figure 6:
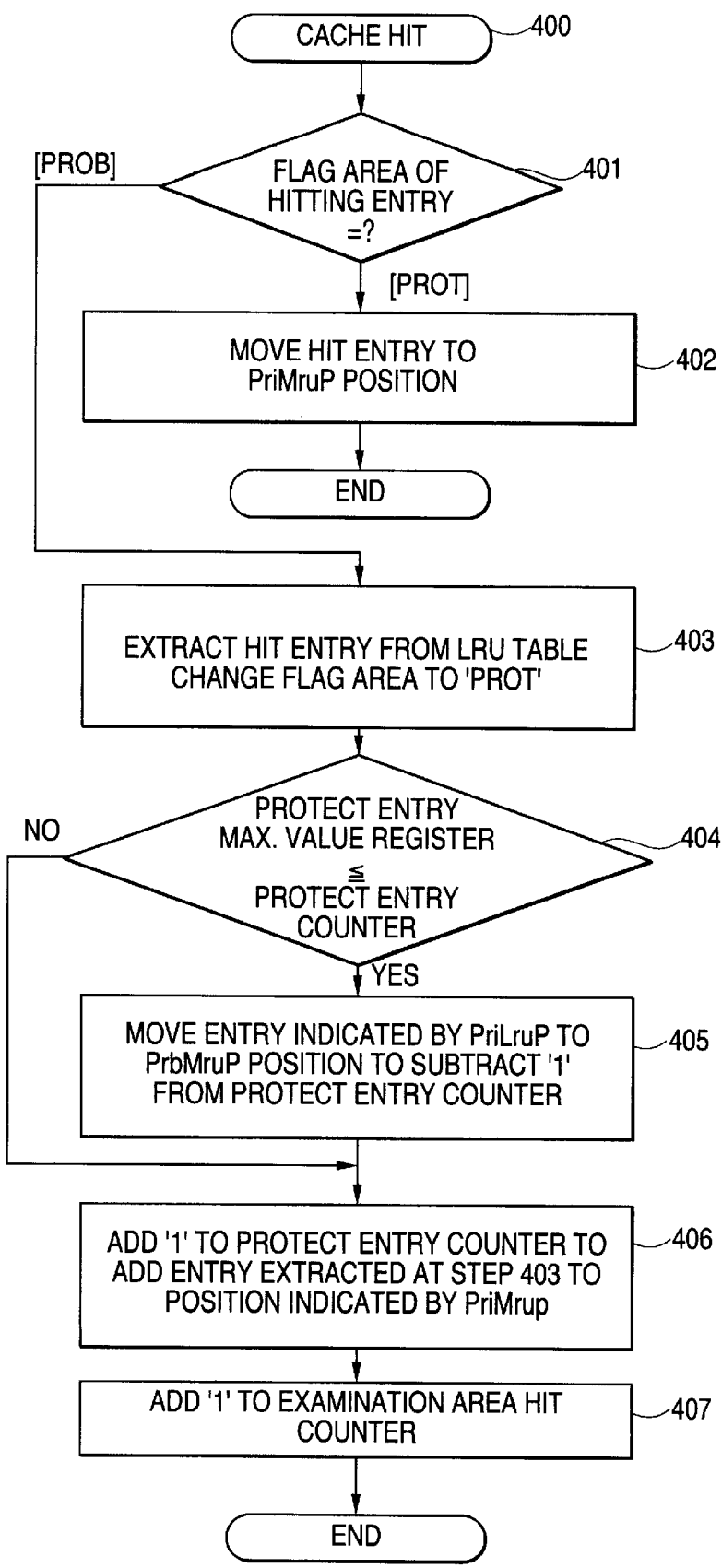
FIG. 6 is a flowchart for illustrating a sequence in case of cache hit in an LRU table shown in FIG. 4.

Next, the cache hit processing is explained with reference to FIG. 6.

The cache hit processing starts at step 400.

First, a hit flag area 4 of an entry 3 hit at step 401 is verified. If the value of the entry is PROT, the program proceeds to step 402. If the value of the entry is PROB, the program proceeds to step 403.

At step 402 (for a case of hit in the protection area 1), this entry 3 is moved to an MRU position of the protection area 1 specified by PrtMruP. At the same time, the value of PrtMruP is updated to terminate the cache hit operation.

At step 403 (for a case of hit in the examination area 2), the hit entry 3 is extracted from the LRU table 33a, and the flag area 4 is changed to a value "PROT".

At step 404, the value of the protect entry maximum value register 7 is compared to that of the protect entry counter 9 and, if "value of the protect entry maximum value register 7"≦"value of the protect entry counter 9", step 405 is executed.

At step 405, the entry 3 at the LRU position of the protection area 1 indicated by PrtLruP is moved to an MRU position of the examination area 2 specified by PrbMruP. At the same time, the values of PrtLruP and PrbMruP are updated, and "1" is subtracted from the protect entry counter 9.

At step 406. "1" is added to the protect entry counter 9 and the entry 3 extracted at step 403 is added to an MRU position of the protection area 1 indicated by PrtMruP. At the same time, the value of PrtMruP is updated.

Then, "1" is added at step 407 to the examination area hit counter 12 to terminate the cache hit operation.

With the second embodiment of the present invention, as described above, it is possible to estimate the frequency of entry substitution in the protection area 1 (step 301).

Therefore, by this decision, it is possible to estimate the probability of re-utilization of the cache pages 33b corresponding to the entry 3 in the vicinity of the LRU position of the protection area 1.

Since the size of the protection area 1 can be increased by the operation of skipping step 405 based on the decision at step 404, or can be decreased (step 303), the protection area 1 can be automatically adjusted to an optimum size.

In each of the above-described embodiments, the operation of the MRU 32 and the control program 31a can be constituted by a hardware logic.

It is to be noted that the present invention can be applied not only to a magnetic disk device, such as a hard disk, but also to a storage device, such as an optical disk device, RAM or a flash memory.

The above-described cache page management method can be furnished as the control program 31a of FIG. 7. Therefore, the medium having the control program 31a stored (or carrying) therein, such as a ROM, RAM or a flash memory is comprised within the scope of the present invention. The medium may include anyone, which can carry the program in the computer readable fashion, e.g., as a network system or in the form carried by a carrier wave, which can be termed as a program product, in general.

The meritorious effect of the present invention are summarized as follows.

According to the present invention, as described above, the entry "seizure" in the protection area can be detected to enable the size of the protection area to be automatically adjusted to an optimum value.

The result is that a high hit ratio can be maintained even in an operating environment in which the disk space accessed by the central processing unit is changed abruptly. Obviously, the present invention is not limited to the above-described embodiments and various embodiments can be suitably modified within the scope of the technical concept of the invention.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. In a system comprising:
   a central processing unit;
   a storage device connected to said central processing unit;
   a cache memory connected to said central processing unit and having an accessing speed higher than that of said storage device;
   a set of a plurality of cache pages provided in said cache memory; and
   an LRU table provided in said cache memory and constituted by a plurality of entries adapted for controlling said cache pages; wherein said LRU table is divided into a protection area and an examination area;
   a method for management of a cache page comprising the steps of:
   (a) that in case of a cache failure, a cache failure entry is stored in said examination area and, on occurrence of overflow of said examination area with entries, an entry at an LRU position of said examination area is extracted and driven out of said cache memory, while the cache failure entry is added to an MRU position of said examination area;
   (b) that in case of a cache hit in said protection area, the cache hit entry is extracted and moved to an MRU position in said protection area and, on occurrence of overflow of said protection area with entries, an entry at an LRU position of said protection area is moved to an MRU position of said examination area; and
   (c) that in case of a cache hit in said protection area, entries in said protection area are interchanged in sequence so that the cache hit entry will assume an MRU position in said protection area;
   wherein the improvement resides in:
   (d) that the most recent accessing time point of each entry is stored and held from one entry to another;
   (e) that, if cache failure has occurred when the central processing unit accesses said cache memory for data writing or data reading into/out of said storage device, the stored time point for an entry at the LRU position of said protection area and that for an entry at the LRU position of said examination area are compared to each other;
   (f) that, if the former time point is earlier, the entry at the LRU position in said protection area is moved to the MRU position in said examination area to reduce the size of said protection area, the cache failure entry is added to the MRU position in said examination area, and an entry at the LRU position in said examination area is driven out of the cache memory; and
   (g) that, if the latter time point is earlier, an entry at the LRU position in said examination area is extracted and driven out of the cache memory and, in its place, the cache failure entry is added to the MRU position in said examination area.

2. The method for management of a cache page as defined in claim 1 wherein said storage device is a disk storage device.

3. The method for management of a cache page as defined in claim 1 wherein said protection area has a variable size from a pre-set maximum value to a pre-set minimum value.

4. The method for management of a cache page as defined in claim 1 wherein the method is used in a batch operation.

5. In a system comprising:
   a central processing unit;
   a storage device connected to said central processing unit;
   a cache memory connected to said central processing unit and having an accessing speed higher than that of said storage device;
   a set of a plurality of cache pages provided in said cache memory; and
   an LRU table provided in said cache memory and constituted by a plurality of entries adapted for controlling said cache pages; wherein said LRU table is divided into a protection area and an examination area;
   a method for management of a cache page comprising the steps of:
   (a) that in case of a cache failure, a cache failure entry is stored in said examination area and, on occurrence of overflow of said examination area with entries, an entry at an LRU position of said examination area is extracted and driven out of said cache memory, while the cache failure entry is added to an MRU position of said examination area;
   (b) that in case of a cache hit in said protection area, the cache hit entry is extracted and moved to an MRU position in said protection area and, on occurrence of overflow of said protection area with entries, an entry at an LRU position of said protection area is moved to an MRU position of said examination area; and
   (c) that in case of a cache hit in said protection area, entries in said protection area are interchanged in sequence so that the cache hit entry will assume an MRU position in said protection area; wherein the improvement resides in:
   (d) that the number of times of entry storage in said examination area and the number of times of entry movement to said protection area are sequentially updated and stored and saved;
   (e) that, if, upon accessing to said cache memory to write or read data into/out of said storage device, said central processing unit has encountered a cache failure, the number of times of entry movement from said examination area to said protection area divided by the number of times of entry storage in said examination area is compared to a pre-set value;
   (f) that, if the former value is larger, an entry of the LRU position in said examination area is extracted and driven out of the cache memory and, in its place, the cache failure entry is added to the MRU position in said examination area; and
   (g) that, if the latter value is larger, the entry at the LRU position in said protection area is moved to the MRU position in said examination area to reduce the size of said protection area, the cache failure entry is added to the MRU position in said examination area and an entry at the LRU of said examination area is extracted and driven out of said cache memory.

6. The method for management of a cache page as defined in claim 5 wherein said storage device is a disk storage device.

7. The method for management of a cache page as defined in claim 5 wherein said protection area has a variable size from a pre-set maximum value to a pre-set minimum value.

8. The method for management of a cache page as defined in claim 5 wherein the method is used in a batch operation.

9. In a system comprising:
   a central processing unit;
   a storage device connected to said central processing unit;

a cache memory connected to said central processing unit and having an accessing speed higher than that of said storage device;

a set of a plurality of cache pages provided in said cache memory; and an LRU table provided in said cache memory and constituted by a plurality of entries adapted for controlling said cache pages;

a computer readable medium carrying a cache page management program, wherein said LRU table is divided into a protection area and an examination area; wherein the program comprises the steps of:

(a) that in case of a cache failure, a cache failure entry is stored in said examination area and, on occurrence of overflow of said examination area with entries, an entry at an LRU position of said examination area is extracted and driven out of said cache memory, while the cache failure entry is added to an MRU position of said examination area;

(b) that in case of a cache hit in said protection area, the cache hit entry is extracted and moved to an MRU position in said protection area and, on occurrence of overflow of said protection area with entries, an entry at an LRU position of said protection area is moved to an MRU position of said examination area; and (c) that in case of a cache hit in said protection area, entries in said protection area are interchanged in sequence so that the cache hit entry will assume the MRU position in said protection area;

wherein the improvement resides in (d) that the most recent accessing time point of each entry is stored and held from one entry to another;

(e) that if cache failure has occurred when the central processing unit accesses said cache memory for data writing or data reading into/out of said storage device, the stored time point for an entry at the LRU position of said protection area and that for an entry at the LRU position of said examination area are compared to each other;

(f) that if the former time point is earlier, the entry at the LRU position in said protection area is moved to the MRU position in said examination area to reduce the size of said protection area, the cache failure entry is added to the MRU position in said examination area, and an entry at the LRU position in said examination area is driven out of the cache memory; and (g) that, if the latter time point is earlier, an entry at the LRU position in said examination area is extracted and driven out of the cache memory and, in its place, the cache failure entry is added to the MRU position in said examination area.

10. The medium as defined in claim 9 wherein said storage device is a disk storage device.

11. The medium as defined in claim 9 wherein said protection area has a variable size from a pre-set maximum value to a pre-set minimum value.

12. The medium as defined in claim 9 wherein the program is used in a batch operation.

13. The medium as defined in claim 9 wherein said medium is a recording medium carrying said program recorded thereon.

14. In a system comprising:

a central processing unit;

a storage device connected to said central processing unit;

a cache memory connected to said central processing unit and having an accessing speed higher than that of said storage device;

a set of a plurality of cache pages provided in said cache memory; and an LRU table provided in said cache memory and constituted by a plurality of entries adapted for controlling said cache pages;

a computer readable medium carrying a cache page management program, wherein said LRU table is divided into a protection area and an examination area, and said program comprises the steps of:

(a) that in case of a cache failure, a cache failure entry is stored in said examination area and, on occurrence of overflow of said examination area with entries, an entry at an LRU position of said examination area is extracted and driven out of said cache memory, while the cache failure entry is added to an MRU position of said examination area;

(b) that in case of a cache hit in said protection area, the cache hit entry is extracted and moved to an MRU position in said protection area and, on occurrence of overflow of said protection area with entries, an entry at an LRU position of said protection area is moved to an MRU position of said examination area; and (c) that in case of a cache hit in said protection area, entries in said protection area are interchanged in sequence so that the cache hit entry will assume an MRU position in said protection area; wherein the improvement resides in:

(d) that the number of times of entry storage in said examination area and the number of times of entry movement to said protection area are sequentially updated and stored and saved;

(e) that, if, upon accessing to said cache memory to write or read data into/out of said storage device, said central processing unit has encountered a cache failure, the number of times of entry movement from said examination area to said protection area divided by the number of times of entry storage in said examination area is compared to a pre-set value;

(f) that, if the former value is larger, an entry of the LRU position in said examination area is extracted and driven out of the cache memory and, in its place, the cache failure entry is added to the MRU position in said examination area; and (g) that, if the latter value is larger, the entry at the LRU position in said protection area is moved to the MRU position in said examination area to reduce the size of said protection area, the cache failure entry is added to the MRU position in said examination area and an entry at the LRU of said examination area is extracted and driven out of said cache memory.

15. The medium as defined in claim 14 wherein said storage device is a disk storage device.

16. The medium as defined in claim 14 wherein said protection area has a variable size from a pre-set maximum value to a pre-set minimum value.

17. The medium as defined in claim 14 wherein the program is used in a batch operation.

18. The medium as defined in claim 14 wherein said medium is a recording medium carrying said program recorded thereon.

* * * * *